May 16, 1961  J. M. TUCKER ET AL  2,984,522
ENDLESS TRACK FOR VEHICLES
Filed April 4, 1958  4 Sheets-Sheet 1
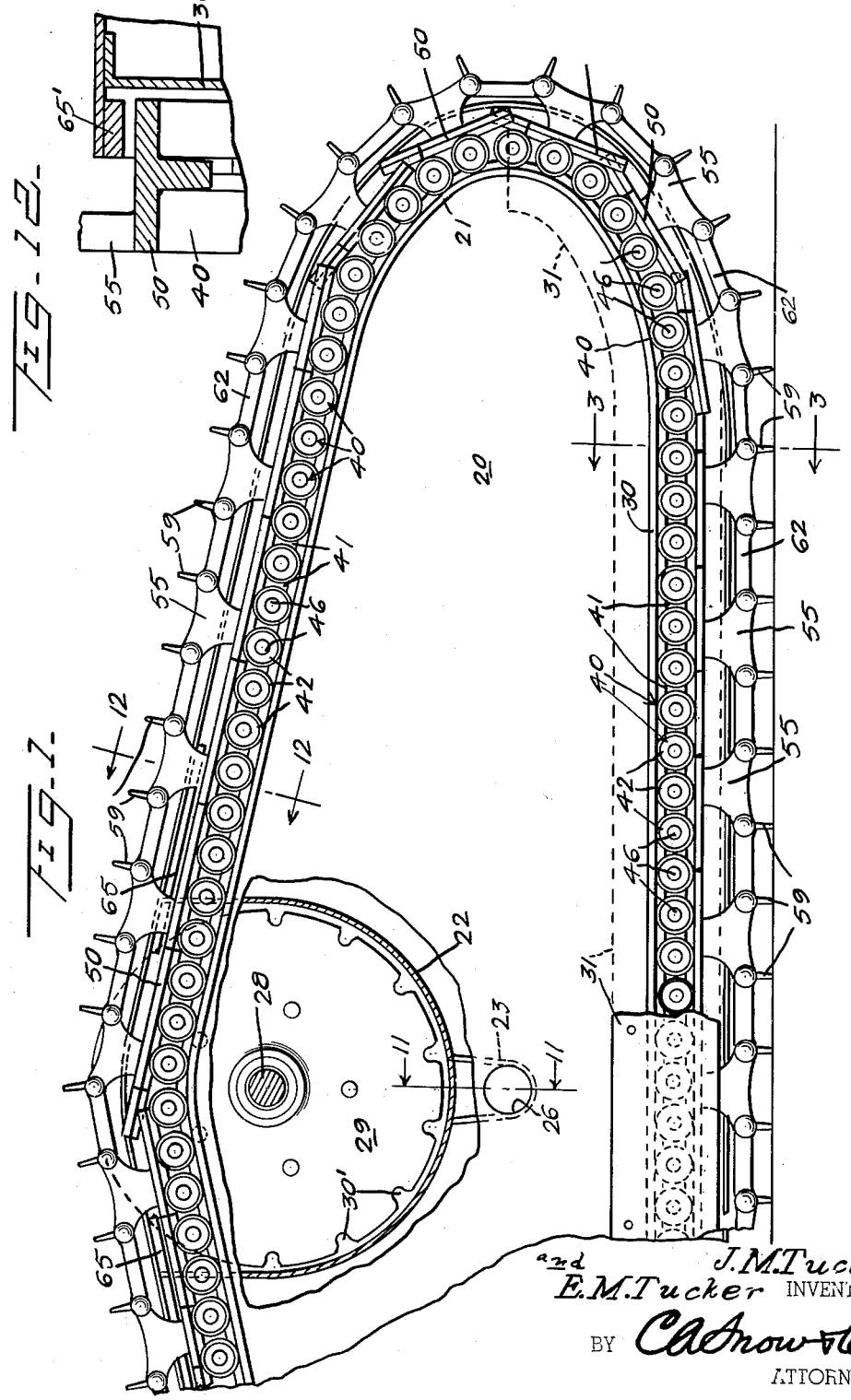
J.M.Tucker
and
E.M.Tucker INVENTORS
BY C.A.Snow&Co.
ATTORNEYS.

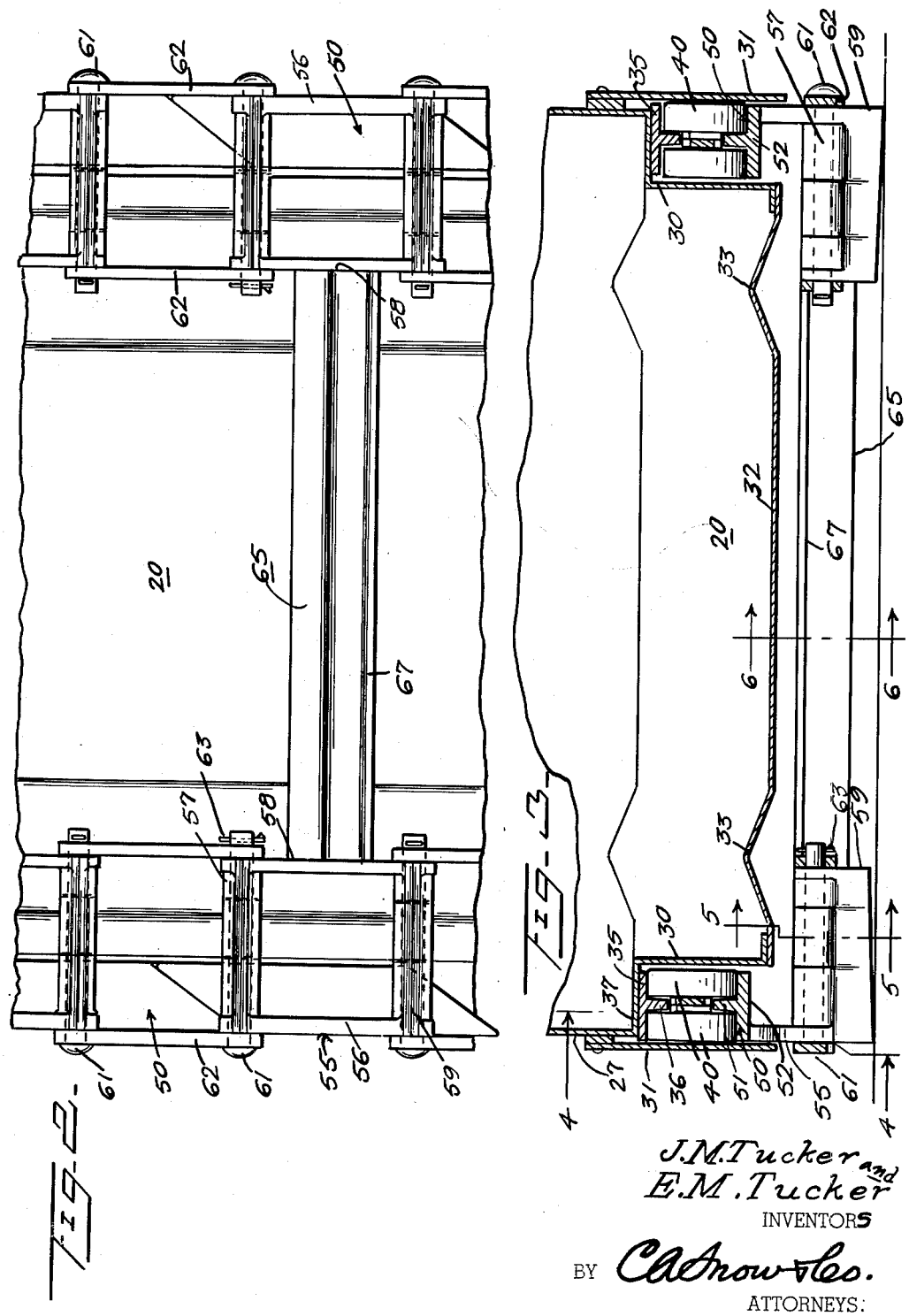

May 16, 1961  J. M. TUCKER ET AL  2,984,522
ENDLESS TRACK FOR VEHICLES
Filed April 4, 1958  4 Sheets-Sheet 3
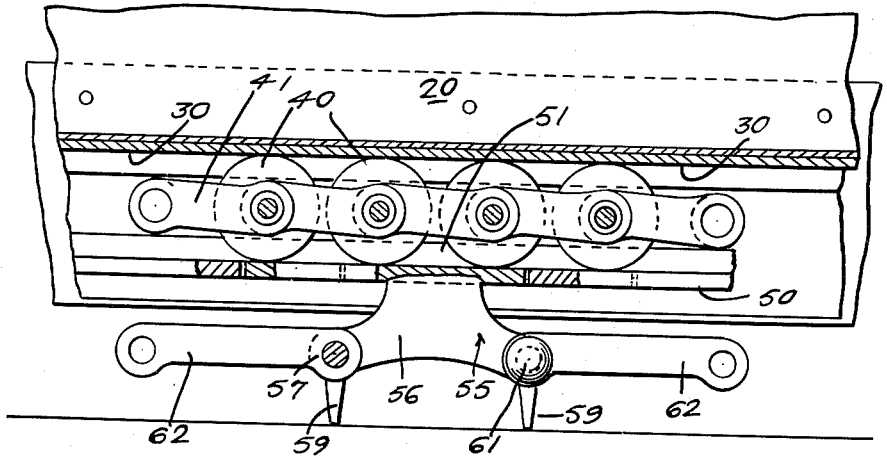
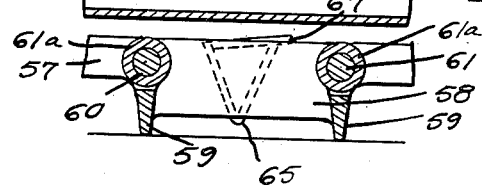
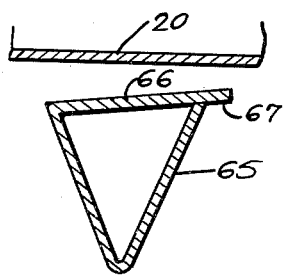
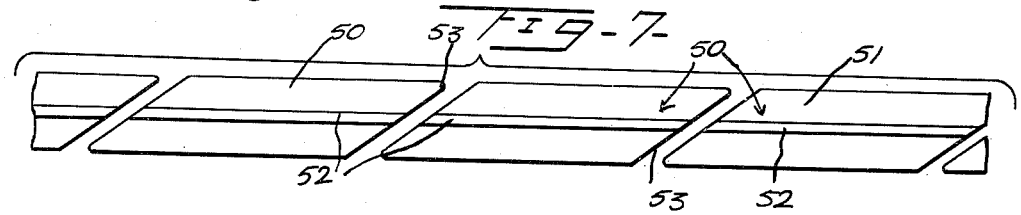
J.M.Tucker and
E.M.Tucker
INVENTORS
BY C.A.Snow & Co.
ATTORNEYS May 16, 1961 J. M. TUCKER ET AL 2,984,522
ENDLESS TRACK FOR VEHICLES
Filed April 4, 1958 4 Sheets-Sheet 4
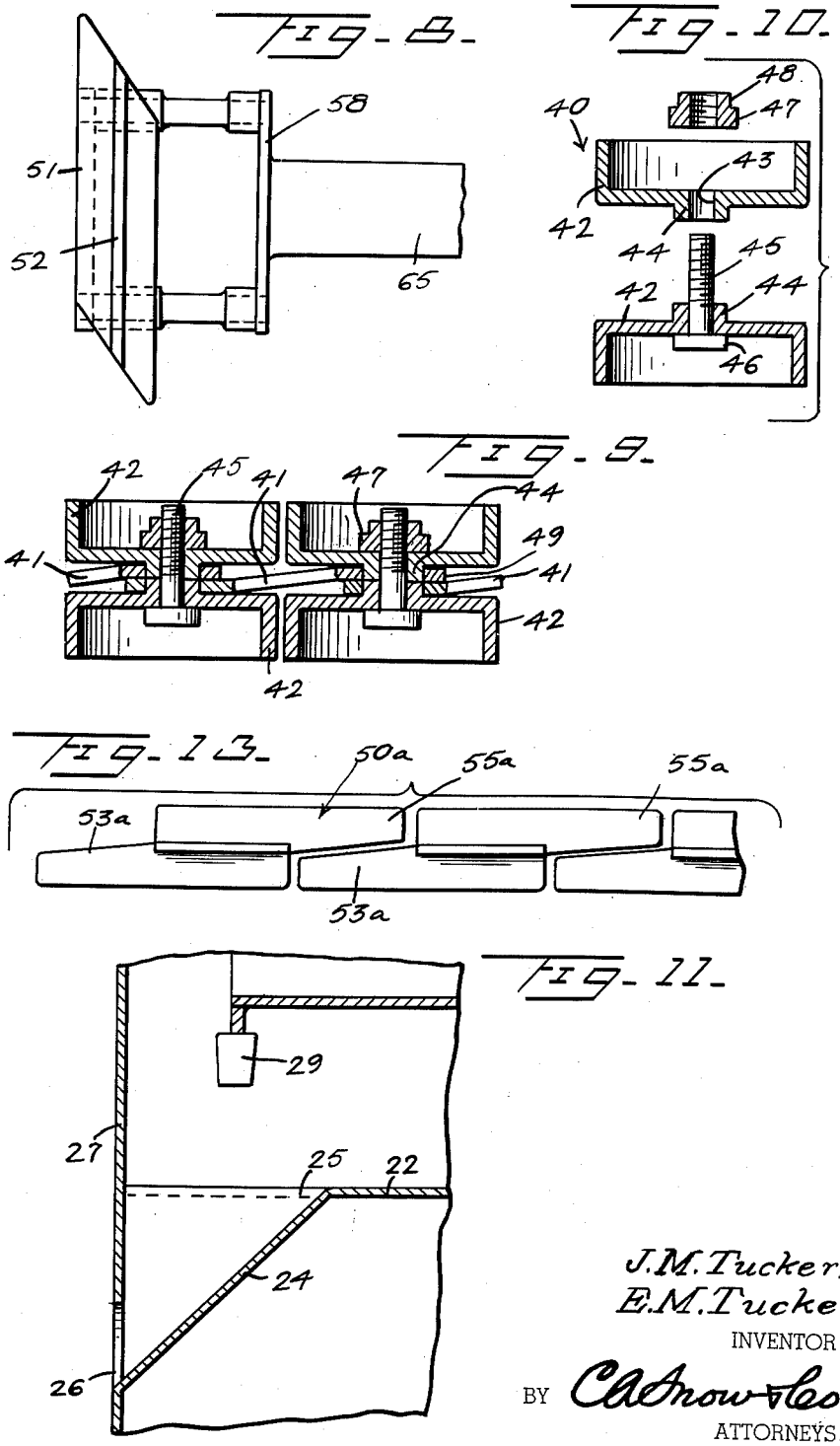
J.M. Tucker and
E.M. Tucker
INVENTOR
BY *CA Snow &Co.*
ATTORNEYS.

United States Patent Office 2,984,522
Patented May 16, 1961

2,984,522
ENDLESS TRACK FOR VEHICLES

Joseph M. Tucker, Medford, and Emmitt M. Tucker, Ashland, Oreg., assignors to Tucker and Sons (Inc.), Grass Valley, Calif., a corporation of California Filed Apr. 4, 1958, Ser. No. 726,526

2 Claims. (Cl. 305—11)

This invention relates to an endless track for vehicles, and has particular applicability to vehicles for use in deep snow and muskeg.

A primary object of this invention is the provision of an improved endless track for vehicles adapted to be mounted on a pontoon, and so arranged that the entire weight of the vehicle supported by the pontoon or pontoons is carried on rollers, rather than shafts or axles.

An additional object of the invention is the provision of a device of this character wherein the supporting means for the track is substantially water-tight, and encompasses peripheral T shaped rails in opposite sides for the accommodation of track rollers which in turn support the track cleats.

An additional object of the invention is the provision of a device of this character wherein the sprocket for driving the endless track is contained in a recess in the water-tight pontoon, in such manner as not to affect the tightness of the pontoon structure per se.

A further object of the invention is the provision of a plurality of track bars extending transversely between track cleats on opposite sides of the pontoon, the track bars being of triangular configuration and inclined toward the direction of the path of travel of the track in order to prevent clogging of stones or the like interiorly of the tread of the vehicle.

An additional object of the invention is the provision of a T shaped guide rail for the track-supporting rollers, to prevent lateral displacement in the event of tilting of the vehicle.

Still another object of the invention resides in the provision of an improved interconnection between the track rollers.

Still other objects reside in the provision of a device of this character which is sturdy and durable in construction, reliable and efficient in operation, and relatively simple and inexpensive to manufacture, assemble and utilize.

Further objects reside in the combinations of elements, arrangements of parts, and features of construction, all as will be more fully pointed out hereinafter, and disclosed in the accompanying drawings wherein there is shown a preferred embodiment of this inventive concept.

Other objects will in part be obvious and in part be pointed out hereinafter.

In the drawings:

Figure 1 is a side elevational view of one form of endless track assembly and its associated pontoon, showing the drive sprocket therefor, and having parts thereof broken away.

Fig. 2 is an enlarged fragmentary bottom plan view showing the track cleats and track bar.

Fig. 3 is an enlarged sectional view taken substantially along the line 3—3 of Fig. 1.

Fig. 4 is a sectional view taken substantially along the line 4—4 of Fig. 3 as viewed in the direction indicated by the arrows.

Fig. 5 is a sectional view taken substantially along the line 5—5 of Fig. 3 as viewed in the direction indicated by the arrows.

Fig. 6 is an enlarged sectional view taken substantially along the line 6—6 of Fig. 3 as viewed in the direction indicated by the arrows.

Fig. 7 is a fragmentary plan view showing the shape of the track shoes.

Fig. 8 is a fragmentary plan view of a track cleat as viewed from the bottom, showing the track shoe, and the associated crossbar.

Fig. 9 is a sectional view taken through a pair of the rollers, showing the means of interconnection thereof.

Fig. 10 is an exploded sectional view of one roller assembly showing the components thereof in disassembled relation.

Fig. 11 is an enlarged sectional view taken substantially along the line 11—11 of Fig. 1 as viewed in the direction indicated by the arrows.

Fig. 12 is a fragmentary detailed sectional view, on an enlarged scale, taken substantially along the line 12—12 of Fig. 1 as viewed in the direction indicated by the arrows, and, Fig. 13 is a view similar to Fig. 7 but disclosing a modified form of track shoe.

Similar reference characters refer to similar parts throughout the several views of the drawings.

As conducive to a clearer understanding of this invention, it may here be pointed out that the primary utility of vehicles having endless tracks is to permit the travel of the vehicles over soft or yielding terrain. Many forms of track vehicles have been devised, but these have been uniformly unsuccessful in travel over snow, particularly over loose or powdered snow, for the reason that the weight, even though distributed, has not been sufficiently widely distributed. An object of this invention is the provision of an improved endless track or tread for such vehicles, which is built around a pontoon, the pontoon in itself serving as a major support for the weight of the vehicle in such mediums as snow or the like, and wherein the weight of the track surrounding the pontoon is distributed over a multiplicity of small rollers, in order that no great concentration of weight may occur at any given point. A primary object of this invention is thus the provision of an improved endless track associated with a pontoon particularly adapted for the support of a relatively heavy vehicle when traveling over powdered snow or similar loose and shifting medium, in which a heavier vehicle even though provided with an endless track with a less even distribution of weight would be apt to sink.

In the illustrative embodiment herein shown there is disclosed only one pontoon with its associated track which may be used for narrow trails, but it is to be understood that customarily at least two pontoons with associated tracks will be employed by each vehicle, and in the case of heavier vehicles four or more pontoons, each pair being independently driven, may be employed if desired.

Having reference now to the drawings in detail, there is generally indicated at 20 a fluid-tight pontoon, having generally rounded ends 21 and having formed at its upper center portion a sprocket or drive casing 22, which is comprised of a fluid-tight substantially semicircular casing extending transversely across the entire width of the pontoon. A drainage trough 23 is provided beneath the casing 22 and, as best shown in Fig. 11, includes an inclined plate 24 which descends from an opening 25 in the bottom wall of the casing 22 to an outlet opening 26 in the side wall 27 of the pontoon. The casing 22 extends entirely across the top of pontoon 20, and contains a drive shaft 28, upon which are mounted at opposite ends a pair of drive sprockets 29, the drive sprockets being provided with transversely extending teeth or channels 30', the purpose of which will be more fully described hereinafter. Power may be supplied to the drive axles 28 from any desired source, such as a conventional internal combustion engine carried by the body of the vehicle.

As best shown in Fig. 3, a channel 30 extends entirely about the rim of pontoon 20. A skirt 31 depends from the lower side of the pontoon and serves as a mud guard. The bottom wall 32 of the pontoon is provided with angular corrugations for reenforcement, as will be more fully described hereinafter. Each channel 30 has extending entirely about the inner periphery thereof a T shaped rail 35, which includes a vertical flange 36, and horizontal flange 37, the horizontal flange 37 being firmly fixed, as by welding, to the inner side of the channel 30.

Each channel 30 contains an endless chain of rollers generally indicated at 40, interconnected by links 41. The skirt 31 also serves to prevent dislodgement of rollers 40 from rail 35 when the vehicle is tilted. As best shown in Figs. 9 and 10 each roller 40 comprises a pair of oppositely disposed cup-shaped half sections 42, each of which is provided with a central aperture 43 surrounded by a collar or flange 44 on the exterior side thereof. The sections 42 are connected by means of a bolt or rivet 45 having a head 46, and a nut 47 having a flange 48, the collars 44 serving to space the opposite half sections 42 from each other to permit the accommodation of links 41. As best shown in Fig. 9 it will be noted that the links are angularly offset, each terminating in an apertured collar portion 49 adapted to surround its associated flange 44, in offset relation, in such manner that there is no binding or clamping effected on the links by the clamping action of the nut 47 on the bolt 45, so that the rollers are free to rotate in the channels 30, and the links are free to swing therebetween. The channel formed between the separate half sections 42 of the rollers 40 serves as a guide for track shoes 50, of T shaped cross section and including a horizontal flange 51, and vertical flange 52. As best shown in Figs. 4 and 7 each track shoe 50 is of a length substantially in excess of the diameter of two or more rollers, and as best shown in Fig. 7 the confronting ends 53 of adjacent track shoes 50 are disposed at oblique angles with respect to the side edges thereof in order to prevent longitudinal tilting of the shoes upon striking an object. Each track shoe 50 carries a track cleat generally indicated at 55, which includes an upstanding T shaped portion 56, from which extend transverse portions 57 which are connected at their opposite ends by plates 58 to form a rectangular cleat. The stem of the T is of a length sufficient to elevate the track shoe to position the rollers a desirable distance above the cleat to prevent clogging of the rollers by snow or the like. Each section 57 carries a sharp cleat blade 59 inclined outwardly (see Fig. 3) to provide teeth to afford a biting action on hard surfaces to prevent side slippage on ice for example. Central bores 60 extending transversely through each portion 57 accommodate pins 61, which are adapted to connect links 62 between adjacent track cleats 55.

Each of the pins 61 is held in position by a cotter pin 63 which extends through a suitable bore in the end thereof, in order that track cleats or links may be replaced with a minimum of effort and difficulty if damaged.

The track cleats of the opposite tracks are arranged in parallelism, and each pair of track cleats is connected by a track bar 65. As best shown in Fig. 6 each track bar 65 is triangular in cross section, and includes an inner face 66 provided with a protruding flange 67, on the side in the direction of travel of the track. The inner face is also inclined toward the adjacent bottom of the pontoon 20 in the same direction, in close proximity to but with necessary clearance from the pontoon bottom, to effect a clearing action to preclude the wedging of stones or other impediments between the track bars and the pontoon bottom.

As best shown in Figs. 1 and 12 the under sides of the channel 30 are provided at suitable positions adjacent the juncture with drive sprocket 29, with holddown pads 65', for the purpose of insuring accurate engagement of the grooves 30' of the drive sprocket with sprocket roller sleeves 61$^a$ to effect the driving of the endless track.

Fig. 13 shows a modified form of track cleat, which is in all respects similar to the previously described track cleat 50, with the exception that in the track cleat 50$^a$ the ends instead of being angled as are the ends 53 of cleats 50 include oppositely offset end portions 53$^a$, the purpose in general effect being substantially identical to that of the previously described modification.

From the foregoing it will now be seen that there is herein provided an improved endless track for vehicles, which accomplishes all of the objects of this invention, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

Having thus described the invention, what is claimed is:

1. In an endless track assembly for vehicles including a body, a peripheral channel, one around each side of said body, a T-shaped track rail in each of said channels, an endless belt of inter-connected rollers operating in each channel, each roller being comprised of two spaced apart half sections between which the T-shaped track rail extends, an endless track extending around each of said endless belts, said tracks being comprised of a plurality of track shoes, riding on said rollers, and track cleats carried by said track shoes, the opposite track cleats of the opposite belts at opposite sides of said body, being connected by transverse track bars, each track bar being triangular in cross section and having its base inclined towards the adjacent portion of the body in the direction of travel of said track.

2. In an endless track assembly for vehicles having a body, a peripheral channel around each side of said body, a T-shaped track rail in each of said channels, an endless belt of inter-connected rollers in each channel, each roller being comprised of two spaced apart half sections between which the T-shaped track rail extends, an endless track extending around each of said endless belts, each track being comprised of a plurality of T-shaped shoes, riding on said rollers, track cleats carried by said track shoes, the opposite track cleats of the opposite belts being connected by transverse bars, each track bar being triangular in cross section and having its base inclined towards the adjacent portion of the body in the direction of travel of said track, and a flange formed along the longitudinal lower inclined edge of each track bar.

References Cited in the file of this patent

UNITED STATES PATENTS

| | | |
|---|---|---|
| 1,364,020 | Barletta | Dec. 28, 1920 |
| 1,561,996 | Perry | Nov. 17, 1925 |
| 1,605,144 | Reuter | Nov. 2, 1926 |
| 1,820,743 | Honstain | Aug. 25, 1931 |
| 2,063,238 | Flynn | Dec. 8, 1936 |
| 2,206,966 | Law | Nov. 18, 1941 |
| 2,328,777 | Bolliger | Sept. 7, 1943 |
| 2,581,365 | Darragh | Jan. 8, 1952 |
| 2,796,303 | Atkinson | June 18, 1957 |
| 2,815,988 | Dowell et al. | Dec. 10, 1957 |
| 2,852,317 | Riemerschmid | Sept. 16, 1958 |

FOREIGN PATENTS

| | | |
|---|---|---|
| 503,196 | France | Mar. 11, 1920 |